Sept. 17, 1957  B. METTETAL  2,806,458
THROTTLE CONTROL VALVE FOR MODEL AIRCRAFT ENGINE
Filed Dec. 12, 1955
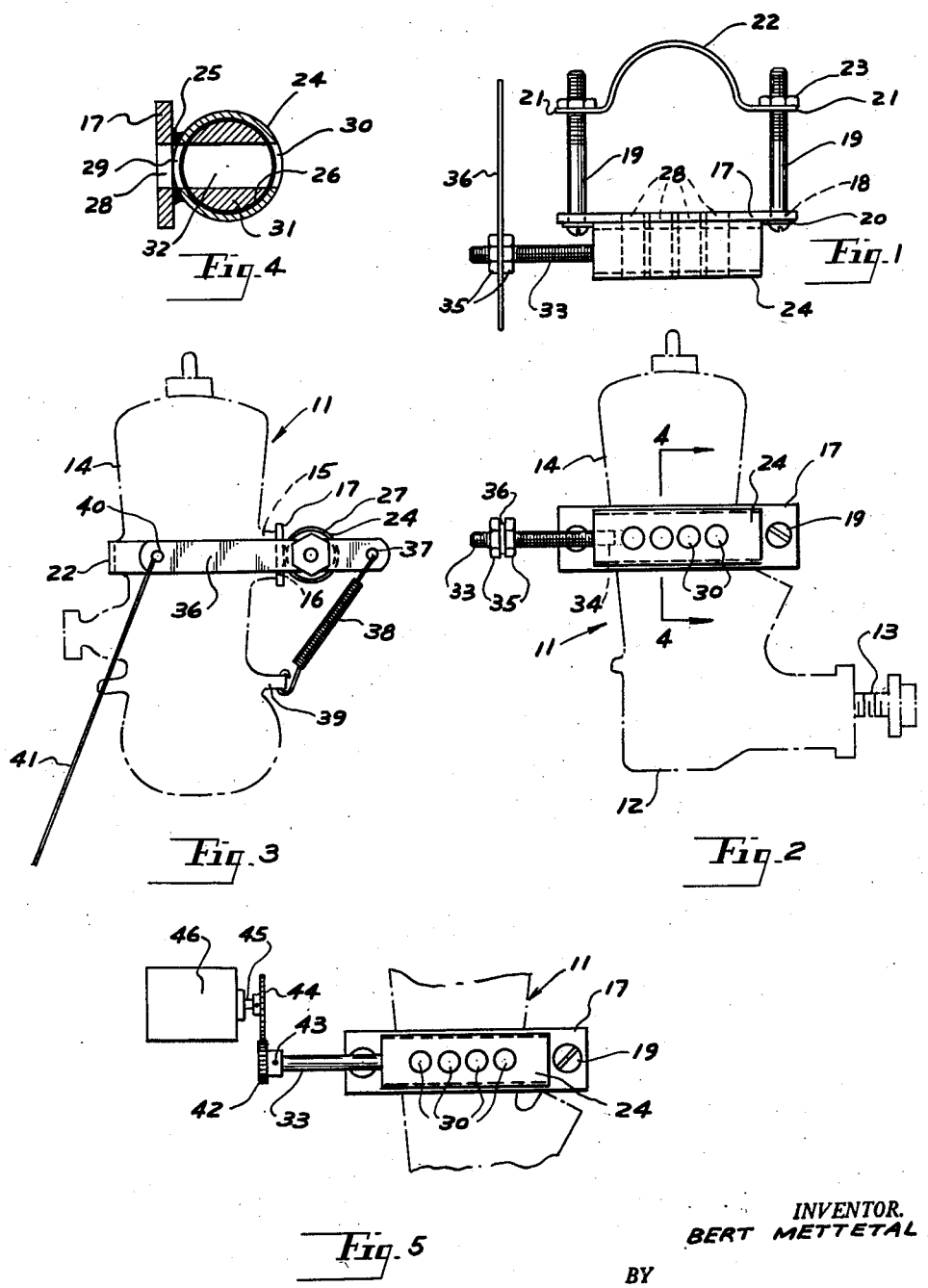
INVENTOR.
BERT METTETAL.
BY
Robert A. Sloman
ATTORNEY.

2,806,458
Patented Sept. 17, 1957

2,806,458

THROTTLE CONTROL VALVE FOR MODEL AIRCRAFT ENGINE

Bert Mettetal, Detroit, Mich., assignor to Don Mettetal, Sr., Plymouth, Mich.

Application December 12, 1955, Serial No. 552,486

6 Claims. (Cl. 123—65)

This invention relates to model aircraft engines and more particularly to a throttle control valve therefor.

Heretofore, various devices have been provided for controlling the speed of model aircraft by direct control or radio remote control through the regulation of the intake of fuel into the engine.

It is the primary object of the present invention to provide a novel construction adapted for attachment to the model aircraft engine which regulates speed of operation by controlling the exhaust therefrom.

It is the further object of the present invention to provide an exhaust throttle mechanism providing an accurate means of regulating the speed of model aircraft engines throughout a complete and variable range whereby the engine may be idled down as low as 1500 R. P. M. or permitted to run at full throttle, or at any intermediate speed.

The present invention is adapted either for manual ground control line or by remote radio control.

It is the further object of the present invention to provide a throttle control valve for regulating the exhaust of a model aircraft engine which is normally spring-biased to full open position and which in response to manual or remote control, may be so regulated as to limit or substantially cutoff the exhaust from the engine, thereby regulating the speed thereof.

These and other objects will be seen from the following specification and claims in conjunction with the appended drawing, in which:

Fig. 1 is a plan view of the present throttle control valve as it is adapted for removable positioning over a model aircraft engine.

Fig. 2 is a front elevational view thereof as mounted over such engine diagrammatically shown in phantom lines.

Fig. 3 is a left side elevational view of Fig. 2 and illustrating a manual control line connection to the throttle valve operating lever.

Fig. 4 is a fragmentary section taken on line 4—4 of Fig. 2; and

Fig. 5 is a fragmentary view similar to Fig. 2 but illustrating a servo motor remote control or radio control for the said throttle valve.

It will be understood that the above drawing illustrates merely a preferred embodiment of the invention and that other embodiments are contemplated within the scope of the claims hereafter set forth.

Referring to the drawing, the present model aircraft engine to which the throttle control valve is adapted is generally indicated at 11 and includes the transmission 12 from which projects crank shaft 13 to which a suitable propeller may be secured in a conventional manner.

The engine shown in Fig. 2 also includes the upright elongated cylinder 14 of conventional construction and which has intermediate its ends the laterally directed horizontally elongated exhaust outlet 15 upon one side thereof to which the present throttle control valve is assembled in the manner hereafter described.

The said exhaust outlet 15 has an upright end face 16 which is horizontally elongated and which has formed therethrough a corresponding horizontally elongated exhaust opening in a conventional manner.

The present throttle control valve includes the upright horizontally disposed header plate 17 which is juxtaposed over the end face 16 of outlet 15 and has formed therein a series of horizontally spaced transverse apertures 28 which communicate with the interior of outlet 15.

A suitable clamp is provided for securing said header snugly and sealingly over outlet 15. In the preferred embodiment of the invention said clamp includes a U-shaped strap 22 adapted to extend around the outer one-half of cylinder 14. Said strap terminates in the aligned outturned end portions 21 which are transversely apertured to cooperatively receive the horizontally disposed parallel spaced fastening bolts 19. Said bolts extend through lock washers 20 and through corresponding apertures adjacent the ends of header plate 17. The threaded ends of said bolts extend through the strap ends 23 and are secured by the nuts 23 to thereby effectively clamp upright header plate 17 to the engine cylinder and in juxtaposition over the end face 16 of exhaust outlet 15.

A horizontally disposed cylinder 24 whose ends in the preferred embodiment are open, is mounted on the exterior of plate 17 and is suitably secured thereto as by the welds 25. It is contemplated, however, that the cylinder 30 may form an integral part of plate 17 if desired.

Said cylinder has a cylindrical bore 26 adapted to loosely and with a slipfit rotatably receive the elongated cylindrical piston 31, the open ends of the said cylinder being generally designated at 27, Fig. 3.

A series of horizontally disposed longitudinally spaced apertures 28 extend transversely through header plate 17 and communicate with the interior of outlet 15.

Said cylinder has formed through its opposing walls aligned pairs of transverse apertures 29 and 30, which pairs are arranged in spaced relation and respectively register with header plate apertures 28.

A series of correspondingly spaced longitudinally arranged transverse apertures 32 are also formed through piston 31 and are normally registerable with the said cylinder apertures 29 and 30 to thereby permit full exhaust to pass through the said header plate and through the respective cylinder apertures 29 and 30. This condition corresponds to a full throttle operation of the engine.

In the preferred embodiment of the invention there is provided threaded shaft 33 which is joined axially of and secured to the end of piston 31 as at 34, Fig. 2, which shaft extends longitudinally of said cylinder and adjacent its outer end has mounted thereover a pair of adjustable lock nuts 35.

Transverse piston operating lever 36 intermediate its ends is apertured so as to be received by shaft 33 and secured thereto by the nuts 35 in the desired position of relative adjustment. Lever 36 is fixedly connected to shaft 33 intermediate the ends of said lever but towards one end thereof as shown in Fig. 3. This end of the lever is apertured at 37 by which coiled spring 38 at one end is joined to said lever, the opposite end of said spring being anchored to said cylinder as at 39, Fig. 3.

The opposite and longer side of said lever at its end is also apertured at 40 to permit the connection of the throttle control valve line 41 thereto.

Normally the coiled spring 38 biases lever 36 so that piston 31 is in the full open position shown in Fig. 4.

When the model aircraft is in flight, in addition to the conventional wires or cables usually interconnecting the operator on the ground and the said aircraft normally controlling the same for circular movements at a fixed or adjustable radius, there is employed this third control line 41 which is connected to the piston operating lever 36 and by which a manual thrust of the user will rotate the said lever 36 against the action of spring 38 to partially or fully close off piston apertures 32 with respect to cylinder apertures 29 and 30.

Accordingly, said piston 31 is rotatable by said line 41 and against the spring 38 to varying positions out of and partially out of registry in varying degrees with the cylinder apertures 29 and 30 for thereby controlling the speed of the engine.

The lever 36 and the line 41 thereby provide selective means for regulating the speed of operation of the said motor and accordingly the speed of the model aircraft.

It is contemplated also that the present throttle control valve may just as well be employed with a model aircraft wherein a radio control is employed instead of the conventional manually operable lines.

In other words, the plane is in free flight with control of the steering apparatus regulated by remote ground operated radio control.

Under these conditions the control line 41 would not be employed, and in its place there would be provided a suitable radio operated servo motor 46 with output shaft 45 adapted to be interconnected with shaft 33 joined to the rotatable piston 31, as above described.

There are several ways that the servo motor may be connected to said shaft. This can be accomplished by a torque rod method, using an escapement and wherein the torque delivered by the servo motor is directly transmitted by a torque rod to rod 33.

Alternately, the servo motor may operate an eccentric rod which interconnects a servo motor driven means and the operating lever 36.

In the preferred embodiment of the present invention, as one means of interconnecting the servo motor 36 with shaft 33, there is shown an intermeshing gear relation for the purpose, of course, of controlling the angular adjustment of shaft 33.

The above mentioned gear 44 meshes with gear 42 secured at 43 to the end of shaft 33.

Accordingly, a ground radio control of servo motor 46 will accurately determine through the said gearing the angular position of shaft 33 for thereby controlling the speed of operation of the model aircraft engine.

While in the drawings there are shown in plate 17 a series of apertures 38, in the cylinder 24 a series of apertures 29 and 30, and in the piston a series of apertures 32, all adapted for registry in varying degrees, it is contemplated as a part of the present invention that the said series of apertures in each case may be replaced by a single elongated slot to accomplish substantially the same results.

Alternately, and as viewed in Figs. 1 and 4, apertures 28 and 29 and 30 may be in the form of an elongated slot, whereas the series of apertures 32 may be retained in the piston if desired.

Having described my invention, reference should now be had to the claims which follow for determining the scope thereof.

I claim:

1. A throttle control valve for a model aircraft engine having an upright cylinder and a laterally directed horizontally elongated exhaust outlet upon one side thereof; an upright header plate juxtaposed over the end of said outlet and having a series of horizontally spaced transverse apertures communicating with the interior of said outlet, a clamp projecting from said plate and secured around said cylinder, a horizontally disposed cylinder housing mounted on said plate and having formed through its opposing walls aligned pairs of openings respectively registering with the header plate apertures, a piston rotatively positioned in said housing and having formed therethrough a row of longitudinally spaced exhaust apertures normally registerable with said housing apertures permitting full exhaust, and rotatable to varying positions out of and partially out of registry in varying degrees for controlling the speed of said engine, and operating means joined to said piston for selectively and rotatively positioning the said piston in said housing.

2. The control valve of claim 1, said housing being open ended.

3. The valve of claim 1, said operating means including a shaft joined to and axially extending from said piston, a lever transversely mounted upon and secured to said shaft, a coiled spring interconnecting one end of said lever with said motor cylinder normally biasing said piston into full open position, the opposite end of said lever being adapted for connection to operating means for rotating said shaft to varying degrees against the action of said spring.

4. A throttle control valve for a model aircraft engine having an upright cylinder and a laterally directed horizontally elongated exhaust outlet upon one side thereof; an upright header plate juxtaposed over the end of said outlet and having an elongated transverse aperture communicating with the interior of said outlet, a clamp projecting from said plate and secured around said cylinder, a horizontally disposed cylinder housing mounted on said plate and having formed through its opposing walls an aligned pair of elongated openings respectively registering with the header plate aperture, a piston rotatively positioned in said housing and having formed therethrough an elongated exhaust aperture normally registerable with said housing apertures permitting full exhaust and rotatable to varying positions out of and partially out of registry in varying degrees for controlling the speed of said engine, and operating means joined to said piston for selectively and rotatively positioning the said piston in said housing.

5. The control valve of claim 4, the aperture through said piston being in the nature of a series of longitudinally spaced exhaust apertures.

6. A throttle control valve for a model aircraft engine having an upright cylinder and a laterally directed horizontally elongated exhaust outlet upon one side thereof; an upright header plate juxtaposed over the end of said outlet and having an elongated transverse aperture communicating with the interior of said outlet, means for securing said plate to said cylinder, a horizontally disposed housing on said plate and having formed through its opposing walls an aligned pair of elongated openings respectively registering with the header plate aperture, a piston rotatively positioned in said housing and having formed therethrough an elongated exhaust aperture normally registerable with said housing apertures permitting full exhaust and rotatable to varying positions out of and partially out of registry in varying degrees for controlling the speed of said engine, and operating means joined to said piston for selectively and rotatively positioning the said piston in said housing.

References Cited in the file of this patent

UNITED STATES PATENTS

| | | |
|---|---|---|
| 1,247,930 | Campbell | Nov. 27, 1917 |
| 1,318,781 | McKechnie | Oct. 14, 1919 |
| 1,483,657 | Glidden | Feb. 12, 1924 |
| 1,671,787 | Schaer | May 29, 1928 |
| 2,256,948 | Lloyd et al. | Sept. 23, 1941 |